(12) United States Patent
Kusuda et al.

(10) Patent No.: US 7,757,089 B2
(45) Date of Patent: Jul. 13, 2010

(54) APPARATUS, METHOD AND COMPUTER PROGRAM FOR DISTRIBUTING AND RENDERING CONTENT

(75) Inventors: Rika Kusuda, Yamoto (JP); Masaru Yamamoto, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 11/245,301

(22) Filed: Oct. 6, 2005

(65) Prior Publication Data

US 2006/0080538 A1    Apr. 13, 2006

(30) Foreign Application Priority Data

Oct. 7, 2004    (JP) .............................. 2004-295057

(51) Int. Cl.
  *H04L 9/32* (2006.01)
(52) U.S. Cl. ........................................ 713/176; 726/28
(58) Field of Classification Search ................ 713/176, 713/165, 189, 193; 382/100; 345/744; 380/277, 380/231, 200, 279, 23; 726/5, 30, 26, 28; 705/59, 51; 709/231, 246
See application file for complete search history.

(56) References Cited

U.S. PATENT DOCUMENTS

| 6,754,822 B1 * | 6/2004 | Zhao ......................... 713/176 |
| 7,349,553 B2 * | 3/2008 | Rodriguez .................. 382/100 |
| 2002/0033844 A1 * | 3/2002 | Levy et al. .................. 345/744 |

FOREIGN PATENT DOCUMENTS

| JP | 2002041398 A | 9/1990 |
| JP | 2000184177 A | 6/2000 |
| JP | 2002232412 | 8/2002 |
| JP | 2002236669 A | 8/2002 |
| JP | 2003309550 | 10/2003 |

OTHER PUBLICATIONS

Applying informed coding and embedding to design a robust high-capacity watermark Miller, M.L.; Doerr,G.J.;Cox,I.J.; vol. 13,Issue 6,Jun. 2004 pp. 792-807 IEEE.*
Secure spread spectrum watermarking for multimedia Cox,I.J.; Kilian,J; Leighton,F.T.; Shamoon, T; vol. 6,Issue 12,Dec. 1997 pp. 1673-1687 IEEE.*

* cited by examiner

*Primary Examiner*—Taghi T Arani
*Assistant Examiner*—Jason Lee
(74) *Attorney, Agent, or Firm*—Mark S. Walker; Shimokaji & Associates, P.C.

(57) ABSTRACT

To distribute Web contents, while ensuring security without increasing a burden imposed on users. The present invention comprises a distribution server for distributing a web content, which is composed of a plurality of digital media associated with each other and has key data for removing a digital watermark embedded in a predetermined digital medium appended to another digital medium as an invisible watermark, and a receiving terminal for receiving and rendering the Web content distributed from the distribution server. The receiving terminal includes a watermark removal control means for extracting key data from a digital medium of a Webcast content, a decoder, for removing a digital watermark embedded in another digital medium corresponding to the digital medium from which the key data is extracted, and a browser for rendering the digital medium from which the digital watermark has been removed.

9 Claims, 11 Drawing Sheets

```xml
<xml>
 <MediaProfile id="video1">
  <MediaFormat>
    <Content>AudioVisual</Content>
    <Format>
      <Name xml:lang="ja">WindowsMediaVideo</name>
    </Format>
    <MediaLocator>
      <MediaUri>mms://videoserver1.ibm.com/wmvideo1.wmv</MediaUri>        <!----Assignment Of Video
    </MediaLocator>
  </MediaFormat>
 </MediaProfile>
 <DetailedDecomposition>
    <AudioVisualSegment id="Scene1">
      <Title> Scene 1</Title>
      <TitleMedia>
        <TitleImage>
          <MediaUri>http://imageserver1.ibm.com/scene1.jpg</MediaUri> <!--Assignment Of The Still Picture At Scene 1
        </TitleImage>
      </TitleMedia>
      <MediaTime>
        <MediaTimePoint>T00:00:00:00</MediaTimePoint>
        <MediaDuration>PT00:00:13:00</MediaDuration>
      </MediaTime>
    </AudioVisualSegment>
    <AudioVisualSegment id="Scene2">
      <Title> Scene 2</Title>
      <TitleMedia>
        <TitleImage>
          <MediaUri>http://imageserver1.ibm.com/scene2.jpg</MediaUri> <!--Assignment Of The Still Picture At Scene 2
        </TitleImage>
      </TitleMedia>
      <MediaTime>
        <MediaTimePoint>T00:00:13:00</MediaTimePoint>
        <MediaDuration>PT00:00:20:00</MediaDuration>
      </MediaTime>
    </AudioVisualSegment>
            :
            :
</DetaledDecomposition>
```

Fig. 3

USERS SUBJECTED TO NO AUTHENTICATION
(ALL VISIBLE WATERMARKS REMAIN EMBEDDED)
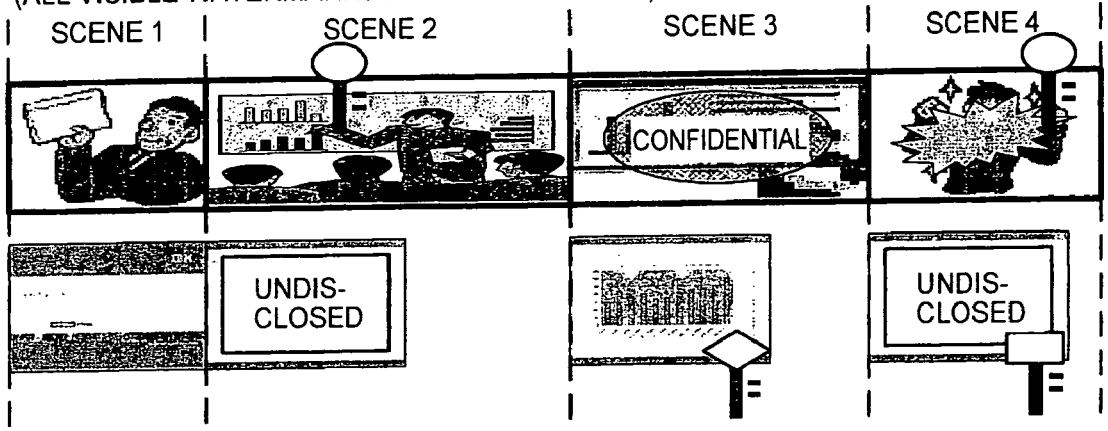
USERS AT USER LEVEL 1
(ALL WATERMARKS ARE REMOVED)
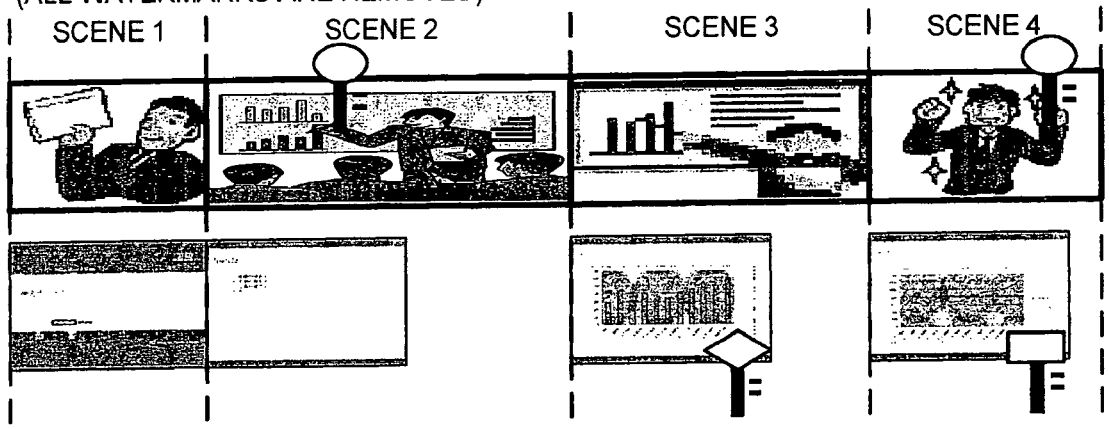
USERS AT USER LEVEL 2
(ONLY VISIBLE WATERMARK B IS REMOVED)
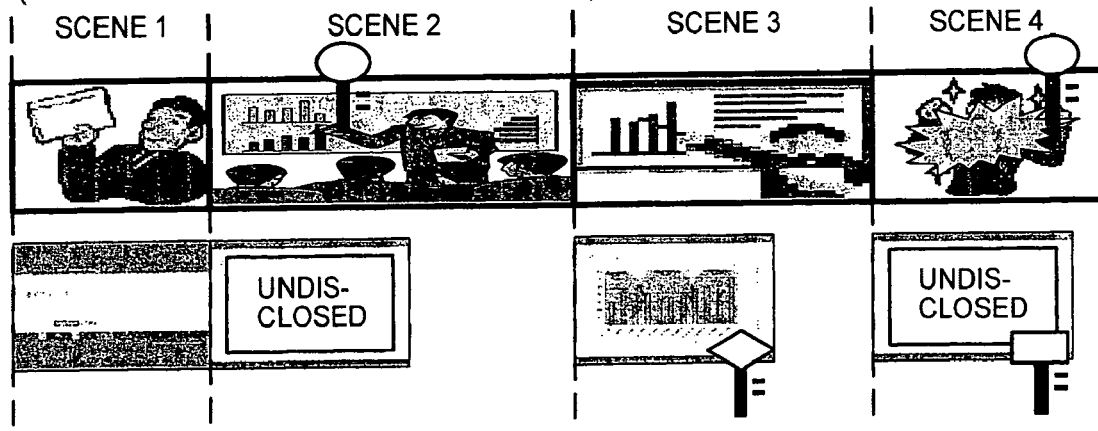
Fig. 7

SCEN 1
   START = 0:00:00
   LASTING TIME = 1" 30
   STILL PICTURE = IMAGE 1
   STILL PICTURE VISIBLE WATERMARK ID = WM1. bmp
   MOVING PICTURE VISIBLE WATERMARK ID = VIDEO WM1. bmp
   AUDOI-VISUAL POSSIBLE LEVEL = 1
SCEN 2
   START = 0:01:30
   LASTING TIME = 2" 10
   STILL PICTURE = IMAGE 2
   STILL PICTURE VISIBLE WATERMARK ID = WM2. bmp
   MOVING PICTURE VISIBLE WATERMARK ID = VIDEO WM2. bmp
   AUDOI-VISUAL POSSIBLE LEVEL = 2
SCEN 3
   •
   •
   •

Fig. 10

APPARATUS, METHOD AND COMPUTER PROGRAM FOR DISTRIBUTING AND RENDERING CONTENT

BACKGROUND

The present invention relates to a protection of web contents transmitted through a Web-based network, and more particularly relates to a method of and a system for protecting Web contents by using a digital watermark.

Nowadays, a presentation form of a digital content (hereinafter referred to as simply "content") which is called Webcast (Webcast: Web broadcasting) using a network as broadcasting media, accompanying technical improvement as well as development of infrastructure in the Web-based network such as Internet, is coming into wide use. (By the way, there is no distinctive definition of the term "Webcast". Sometimes, however, the term is widely used for video distribution, audio distribution, simultaneous distribution of them and on-demand distribution, or combination and synchronization of different digital media, for example, those of a video and an audio with a static image and an animation image and so forth. However, in the present patent specification, it is to be noted that the term Webcast is used as the meaning of the one in which a plurality of types of digital media such as the video, the audio and the static image and so forth are rendered, taking synchronization among them on a browser). In the Webcast, the contents which is composed of a plurality of different types of digital media such as video, audio and static images and so forth are frequently transmitted, and there conventionally exists various tools to develop the contents composed of such plurality of different kinds of digital media (See, for example, "PowerPoint 2003 AddIn: Microsoft Producer for Microsoft Office Power Point 2003", [online], Microsoft, [on Aug. 27, 2004, search conducted], Internet<URL:http://www.microsoft.com/downloads/details.asp x?FamilyID=1b3c76d5-fc75-4f99-94bc-784919468e73&DisplayLang =ja>, and;

"Homepage Builder e-Learning teaching materials making extension", [online], IBM Japan, [Aug. 27, 2004, search conducted], Internet<URL:http://www-6.ibm.com/jp/software/internet/hpb/hpbe1.html>). Generally, each of the digital media composing such kind of contents is distributed by the different types of servers such as streaming server and HTTP server, and is rendered as a unified content after synthesized on the Web browser installed in the receiving terminal.

At this stage, in the Webcast, it is sometimes requested that a control is conducted so as not to enable all of users to get all of audio-visual contents but to enable a limited part of the users to get only a limited part of the contents. To realize such controlling, there has been provided one conventional measures in which a portion of digital media such like video, static image, audio and so forth can be hidden by means of the digital watermark (See, for example, Japanese Published Unexamined Patent Publication (Kokai) No. 2000-184177). The digital watermark technology is the one in which the various kinds of information is embedded in the contents by processing the original data of the contents, and is used for the purpose of protecting a copyright and the like. There are two kinds of digital watermarks, i.e., a visible digital watermark that a viewer can recognize and an invisible digital watermark that a viewer cannot usually recognize.

The visible digital watermark to be embedded can be freely selected from various types ranging from one at a high degree in which all of the original still image and video is made virtually invisible (strong visible digital watermark) to a one at a low degree in which the original image and video are almost not influenced (weak visible digital watermark). Due to such feature of the visible digital watermark, for example, the weak visible digital watermark may be embedded in a specified scene of the contents for a promotion purpose and advertisement purpose. In this case, a user is able to watch and listen to the scene with the weak visible digital watermark in quality of image close to the original image quality. Even so, if any illegal use of the image contained in the scene occurs, such usage can be found at a glance by perceiving such weak visible digital watermark. An operation is required to remove the digital watermark by using a dedicated software while providing, for instance, a correct password and key data to thereby render the original image and audio of the contents in which the visible digital watermark is embedded. On the other hand, the invisible digital watermark cannot usually be perceived by a viewer when the contents is rendered, and therefore, a content that does not seem to have any difference in its quality as compared to the image and audio of the original contents with no digital watermark embedded therein is rendered. Nevertheless, the information embedded as the digital watermark in the contents can be extracted through a data processing and accordingly, the invisible digital watermark may be used to find an illegal usage of the contents by detecting the watermark.

Hence, it is possible to provide such a control that a part or all of the video and audio in the contents is hidden by applying the visible digital watermark to the digital media in the contents distributed by Webcast and as a result, only specified users or viewers can remove the visible digital watermark and watch and listen to the original video and audio.

SUMMARY OF THE INVENTION

As described hereinbefore, it is possible to use the visible digital watermark in a case where a part or all of the contents should be hidden against a part of users in the Webcast. If the original data of the contents are processed so as to embed the visible digital watermark in the contents, and if the key data for removing the visible digital watermark is provided to specified users, unspecified ordinary users may be permitted to render only the contents having the embedded visible digital watermark therein.

To the contrary, the specified users with the key data may watch and listen to the original contents from which the visible digital watermark is removed.

However, in practical use of the system, there is a problem such that a method of or a mechanism for providing the key data for removing the visible digital watermark to the specified users becomes cumbersome. That is, in order for permitting only specified users to use the key data, security of the key data itself must be ensured by employing such means as coding of the key data or authentication. However, an increase in the security level will result in necessity of more troublesome work such as decryption process for the encrypted key data before using the key data, and a burden imposed on the user therefore increases. Consequently, convenience of Webcast is reduced.

Therefore, an object of present invention is to provide a technique to control rendering of the contents using the visible digital watermark, and to ensure the security of contents and key data without increasing in a burden imposed on users.

Other object of the present invention is to provide a highly useful Webcast system by employing a method of carrying out the above-mentioned technique of rendering control of the contents.

Means for Solving the Problems

To achieve the above mentioned objects, in accordance with the present invention, a contents rendering apparatus constituted in a manner as described below will be realized and provided. That is, the apparatus according to the invention is a content rendering apparatus for rendering a unified content composed of a plurality of contents including at least first and second contents. The first content has, embedded therein, a first digital watermark, and the second content has embedded therein a first key capable of removing the first digital watermark. The content rendering device further includes a detecting means for detecting said first key from the second content; a removing means for remove the first digital watermark based on the first key, and a rendering means for rendering the unified content.

In the described rendering device, it may be that a second digital watermark is embedded in the second content and a second key is embedded in the first content. The second key is capable of removing the second digital watermark. The detecting means detects the second key from the first content. Then the removing means removes the second digital watermark based on the second key.

More preferably, the first digital watermark and the second digital watermark prevent the rendered first and second contents from being perceived respectively (for example "visual perception"). Particularly, there exists a plural types of first and second digital watermarks, respectively, and a manner for preventing the perception of the rendered first and second contents may respectively vary. Moreover, the first and second keys are embedded in the second and first contents as the digital watermark which does not prevent the rendered second and first contents from being perceived. Further, the rendering means renders the first and second contents in synchronization.

Further preferably, the first and second contents are sectioned for each scene to be rendered, respectively. A given section of the first content has the first digital watermark embedded therein and a section of the second content corresponding to the given section of the first content has, embedded therein, the first key capable of removing the first digital watermark. The detecting means detects the first key from the corresponding section of the second content, and the removing means removes the first digital watermark of the given section of the first content based on the first key. When the first content comprises data on a plurality of still images, the rendering scene corresponds to a rendering time of data on each of the still images. Also, when the first content comprises video data and/or audio data, the render scene corresponds to a rendering time of a part of the video data and/or the audio data.

Moreover, this device may comprise a controlling means that controls rendering of a part or whole of the plurality of contents depending on a user. More particularly, the controlling means memorizes user permission information indicating a perception permission level of the user, and controls whether or not the first digital watermark should be removed based on the user permission information. Alternatively, this controlling means memorizes user permission information indicating a perception permission level of the user, and controls which type of the first digital watermark should be removed watermarks should be removed based on the user permission information.

Another aspect of the present invention capable of achieving the above-mentioned objects, is realized by a computer program product capable of permitting a computer to function as a content rendering apparatus, which renders a unified content composed of a plurality of contents including at least first and second contents. In this program, when the first content has embedded therein a first digital watermark and the second content has embedded therein a first key capable of removing the first digital watermark, this computer program enables the computer to perform a first detecting function that detects a first key from the second content and a first removing function that removes the first digital watermark based on the first key.

More preferably, when the second content has a second digital watermark embedded therein and the first content has a second key embedded therein, which is capable of removing the second digital watermark, this computer program enables the computer to perform a second detecting function that detects the second key from the first content and a second removing function that removes the second digital watermark based on the detected second key.

A further aspect of the present invention is realized a content distribution and render system provided with a server configured to distribute a plurality of contents and a client configured to receive the plurality of contents through a network and renders the plurality of contents. In this system, the server is provided with a storing section configured to store the plurality of contents. Further, the plurality of contents includes at least first and second contents. The first content has embedded therein a first digital watermark and the second content has embedded therein a first key capable of removing the first digital watermark. On the other hand, the client is provided with a detecting means that detects the first key from the second content a removing means configured to remove the first digital watermark based on the detected first key and a rendering section configured to render a unified content composed of the plurality of contents. Preferably, this system has, as the above-mentioned server, the first server distributing the first content and the second server distributing the second content. In addition, the client receives at least the first and second contents via a network, and then renders a unified content composed of the first and second contents.

Moreover, a still further aspect of the present invention is realized by a content rendering method of rendering a unified content composed of a plurality of contents including at least first and second contents. In this method, the first content has embedded therein a first digital watermark and the second content has embedded therein a first key capable of removing the first digital watermark. The method includes a first detecting step for detecting the first key from the second content a first removing step for removing the first digital watermark based on the detected first key and a rendering step for rendering the unified content.

Preferably, in this method, the second content has embedded therein a second digital watermark and the first content has embedded therein a second key capable of removing the second digital watermark. The method includes a second detecting step for detecting the second key from the first content and a second removing step for removing the second digital watermark based on the detected second key.

In accordance with the above-configured present invention, security can be ensured without any increase in a burden imposed on users for distributing key data for removing digital watermarks. Also, according to the present invention, since the key data is embedded in a predetermined digital media and is provided to users, even the server providing the digital media need not to have any secure means for conducting communication. Hence, the burden imposed on the users is reduced. Based on these advantages, with the present invention, it is easy not only to integrate a system but also to incorporate the present invention into a conventional existing system. Thus, provision of the distribution system of Web contents with extremely high utility can be made.

BRIEF DESCRIPTION OF THE DRAWINGS

FIG. 3 is a diagrammatic view illustrating an example of meta-data describing the corresponding relationship among digital media in the Webcast content.

FIG. 7 is an explanatory view illustrating a situation in which removable visible watermarks in the Webcast content shown in FIG. 4 are different in accordance with a user level.

FIG. 10 is a diagrammatic view illustrating an example of setting of patterns of the visible watermarks and the audible levels for every scene by the meta data according to the embodiment of the present invention.

DETAILED DESCRIPTION

A description of the preferred embodiment of the present invention will be provided hereinbelow, with reference to the accompanying drawings.

Figure 1:
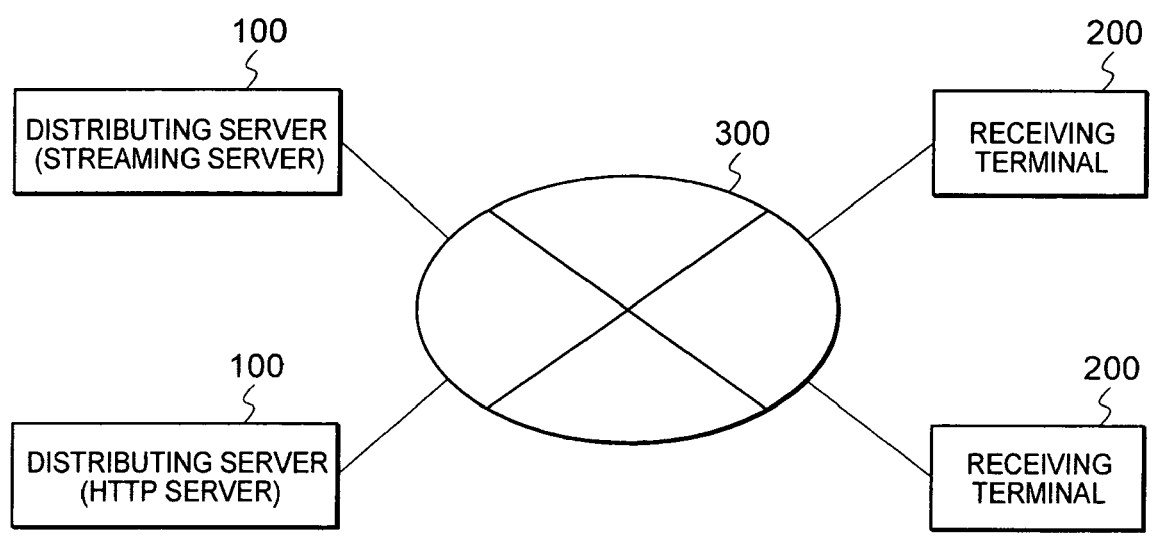
FIG. 1 is a schematic view illustrating the constitution of a Webcast system according to an embodiment of the present invention.

FIG. 1 is a schematic diagram illustrating the constitution of Webcast system according to an embodiment of the present invention.

Referring to FIG. 1, the system according to the present embodiment is provided with a distributing server 100, which distributes Webcast contents and a receiving terminal 200 which receives the Webcast contents distributed from distributing server 100 and enables watching and listening to the received Webcast contents. The distributing server 100 and the receiving terminal 200 are connected through a Web-based network 300 such as Internet or Intranet and so forth. Although only one receiving terminal 200 is illustrated in FIG. 1, a plurality of receiving terminals 200 are connected to the distributing server 100 in an actual system. Incidentally, it is assumed in the embodiment that the Webcast contents are contents composed of a plurality of digital media.

As shown in FIG. 1, the distributing server 100 is provided with a Web server function and transmits Webcast contents composed of a plurality of kinds of digital media such as video, still image and audio to the receiving terminal 200 via the network 300. The receiving terminal 200 that is a transmission target may either be limited to a specific receiving terminal 200 that obtained authentication, or be an unspecified one. Also, the receiving terminal 200 is provided with a browser (Web browser), and renders (displays and reproduces) the Webcast contents received from the distributing server 100. Two receiving terminals 200 are illustrated in FIG. 1; however it is needless to say that the number of receiving terminal 200 is not limited to two in an actual system. Further, a plurality of kinds of digital media transmitted to the respective receiving terminals 200 can be distributed from different servers, respectively, depending on the varieties of media. Therefore, the variety and number of servers are not limited to two kinds of distributing servers 100 (streaming server and HTTP server), as illustrated in FIG. 1.

Herein, Webcast contents in this embodiment is the content composed of a plurality of kinds of digital media such as video, still images and audio, and files of respective digital media are mutually correlated.

Figure 2:
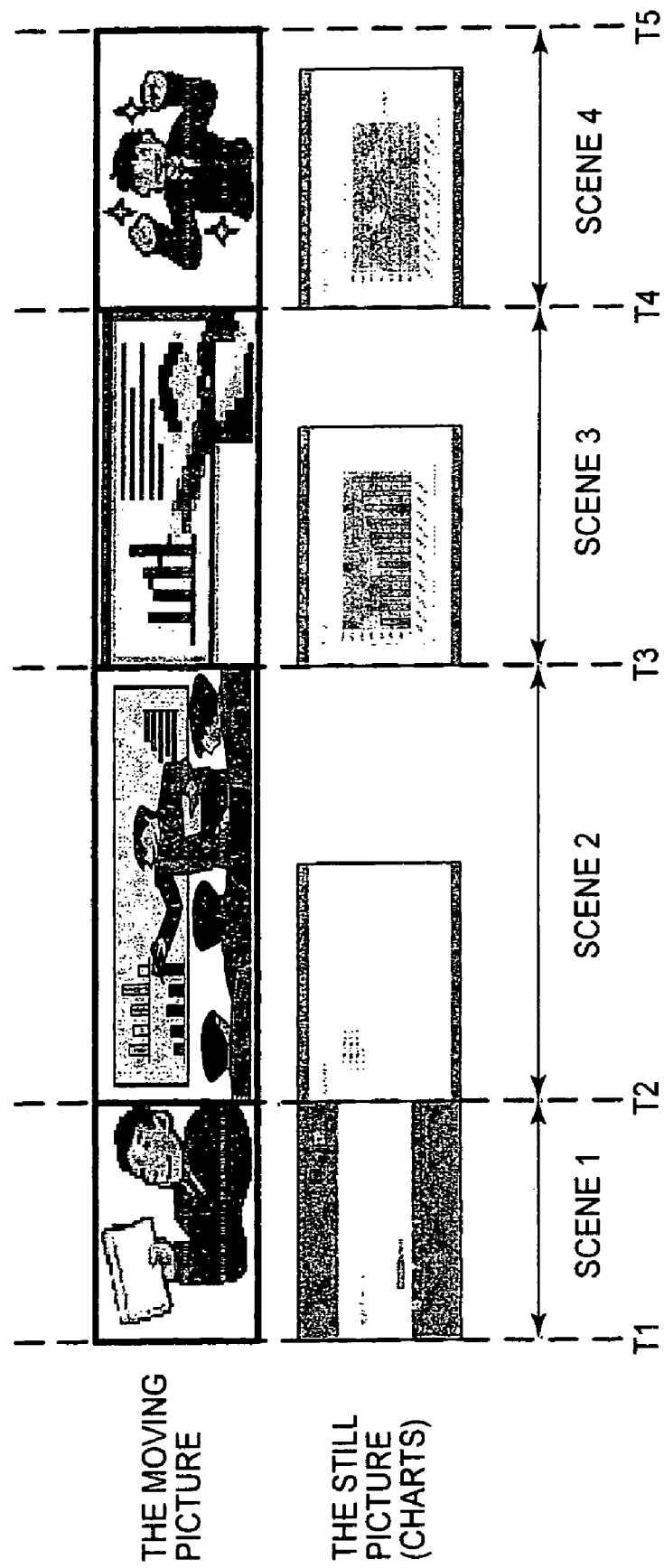
FIG. 2 is a diagrammatic view illustrating a corresponding relationship among digital media in the Webcast content.

FIG. 2 is a schematic view to illustrate such correlation among the digital media in Webcast contents taking the video and the still images as an example. Because of specifying a reproducing time (time offset) to conduct rendering from the top of the contiguous video as a reference time interval, such specific time duration is defined as a "scene" in order to take a synchronization as a whole. As shown in FIG. 2, a still image in association with each of the scenes is assigned and brought into a mutual correlation. Therefore, in the present embodiment, specifying a scene can be accomplished by correlating a given duration of a time offset with which of the still images, irrespective of the content of the video.

Restriction to any specified method, which integrally maintains the correlation among a plurality of kinds of digital media constituting the Webcast contents, is not particularly made; however, in the present embodiment, it is to be noted that a mutual relationship among the digital media is described by the meta-data. Hence, information of the correlation among the digital media is not written in the individual describing formats of the media and thus, the files of the digital media may be formed as a standard media format. Therefore the system of the present embodiment can be easily applied to the conventionally existing digital media.

FIG. 3 is a view of the illustration describing a mutual correlation among the digital media in Webcast contents.

The meta-data shown in FIG. 3 are described by XML format, and with respect to a Webcast content composed of video and still images, such a structure is employed in which a portion describing the information of the total content and a further portion describing the information of every one of the divided scenes are employed. That is, one video is referred to by the whole content ([mms:// . . . ] represents access to the video server). Here, the description [mms:// . . . ] is using Microsoft Media Server Protocol which is the proper streaming distribution protocol of Microsoft Corporation. In practice, application area of the present embodiment is not limited only to Microsoft Media Server, but also to other streaming servers.) And the scenes of the video are defined by Detailed Decomposition. More specifically, titles of every scene, the referenced URI (Uniform Resource Identifier) of the still images (image data) correlated with the respective scenes, and the starting time and the duration length of time are described.

In the foregoing description, there has been provided a description of a mutual correlation provided between the video and the still images; however, the method to provide the correlation may be selected properly in accordance with the kinds of the digital media. For example, in the case of the audio and the still image, the mutual correlation may be provided between respective time offsets of audio and the respective still images in a manner similar to the case of the video and still images. Also, in the case of providing a correlation between the video and the audio prepared as individual digital media, it is possible to decide the video and the audio at every scene by providing a correlation between time offsets of the respective digital media. These methods of providing a correlation between the digital media can adopt the method applied to conventional existing Webcast contents. Thus, digital media constituting the Webcast content can take various kinds of combination; however, in an explanation provided hereinbelow, consideration will be given to the Webcast contents composed of a combination of, for example, the video and still images.

In the present embodiment, a visible digital watermark is embedded in each of the digital media constituting the Webcast content for protection. Embedding of the visible digital watermark can be performed arbitrarily in every scene set in a manner described hereinabove. That is to say, it can be controlled whether to embed the visible digital watermark for every scene. The type of a visible digital watermark to be embedded is also changeable. Key data for removing the visible digital watermark embedded in a predetermined scene in the predetermined digital media is appended to, for example, the data of any separate digital media within the same scene. In this embodiment, it should be understood that the key data means a description of information necessary for removing the visible digital watermark embedded in the digital media. The information described as the key data may take a removing pattern for directly removing the visible digital watermark, or may also be an ID to obtain such removing pattern or to identify a processing method of removing the visible digital watermark.

Figure 4:
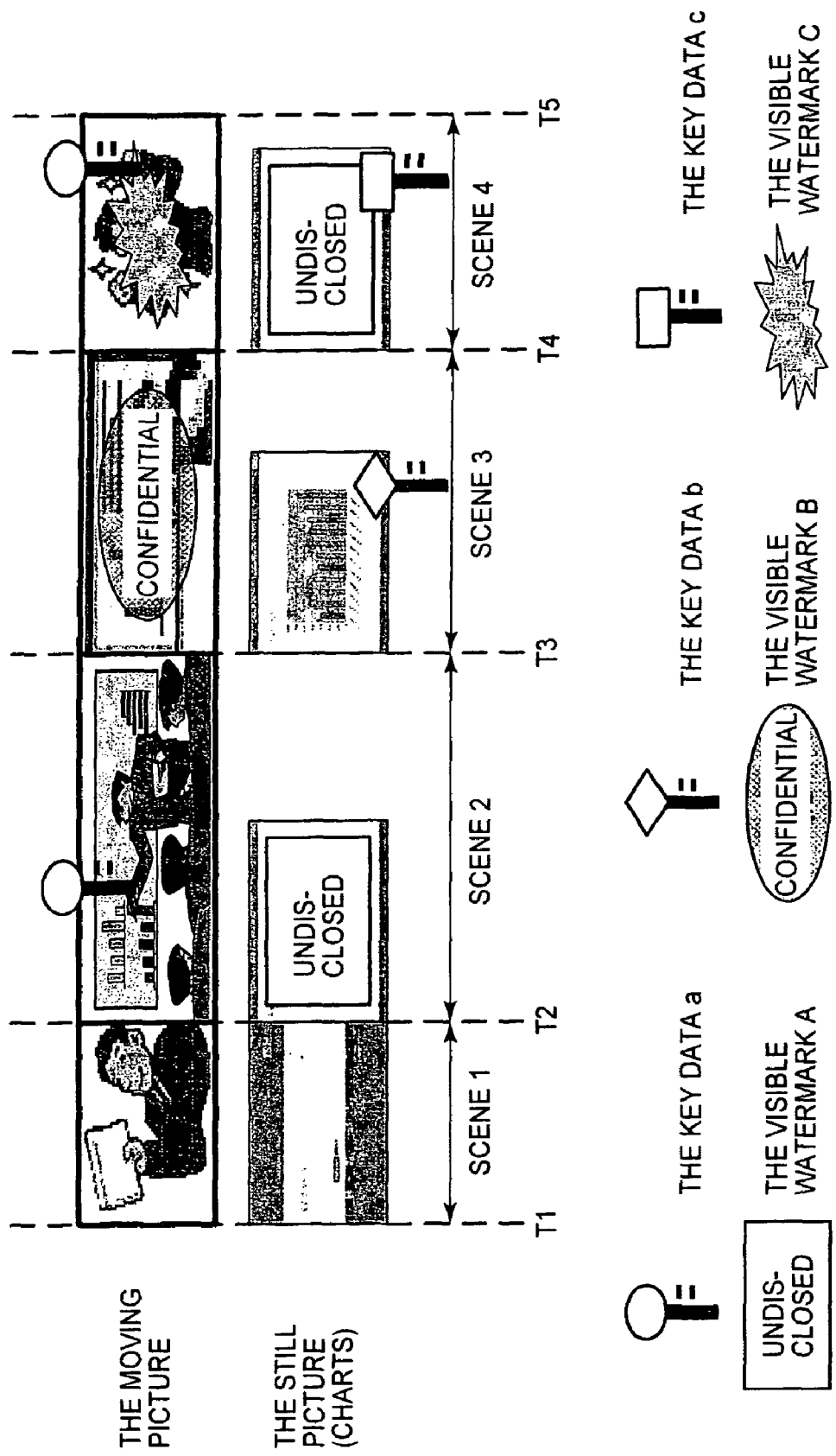
FIG. 4 is a diagrammatic view illustrating an example of correspondence between the visible watermarks and the key data embedded in the Webcast content according to the embodiment of the present invention.

FIG. 4 is a diagrammatic view illustrating an example of correspondence between the visible digital watermark embedded in Webcast content composed of the video and the still images, and the key data. In scene 2 appearing between the time-offset T2-T3, as shown in FIG. 4, the visible digital watermark "A" embedded in the still image, and the key data "a" for removing the visible digital watermark "A" is embedded in the video data. Moreover, in scene 3 of time-offset T3-T4, and in scene 4 of time-offset T4-T5, the different visible digital watermarks "B" and "C" are embedded in the video while the key data "b" for removing the visible watermark "B" of scene 3 and the key data "c" for removing the visible digital watermark "C" of scene 4 is embedded in the still image of scene 4, respectively. Moreover, in scene 4, the visible digital watermark "A" is embedded in the still image as well, and the key data "a" for removing the digital watermark "A" is embedded in the video data (in the example of FIG. 4, the visible digital watermarks embedded in scene 2 and scene 4 may be removed by using common key data. However, the visible digital watermark to be removed by using separate key data may be used). These key data are embedded in the data of the respective video and still image as invisible digital watermarks.

In Webcast system by the present embodiment, as shown in FIG. 4, Webcast content in which the visible digital watermarks for protection (the digital media such as the video and still image) and the invisible digital watermark containing the key data for removing the visible digital watermarks are embedded, are transmitted from the distribution server 100 to the receiving terminal 200. Then, since the visible digital watermarks are removed based on the key data obtained by reading the invisible digital watermarks, the original images as well as audio that are included in the Webcast content are rendered. Respective digital media constituting the Webcast content are stored in the distribution server 100 in a condition such that the visible watermarks and the invisible digital watermarks for key data are embedded in advance. A description of a method of generating Webcast content in which these digital watermarks are embedded will be hereinafter provided.

In the example of FIG. 4, with regard to the two types of digital media (the still image and the video), the key data for removing the digital watermark in one of the two digital media is embedded in the other. In the case of the Webcast content composed of three types of digital contents, if the scene in which the visible digital watermark and the key data are embedded is the same, the digital watermarks can be embedded in an arbitral manner. For example, a circular arrangement may be adopted in which, for example, key data to be used for a visible digital watermark in the first digital media is embedded in the second digital media, key data to be used for a visible digital watermark in the second digital media is embedded in the third digital media, and key data to be used for a visible digital watermark in the third digital media is embedded in the first digital media. In a different case, a further arrangement may also be feasible in which, for example, key data to be used for the first and second visible digital media is embedded in the third digital media, and only the key data to be used for a visible digital watermark in the third digital media is embedded in the first digital media.

Figure 5:
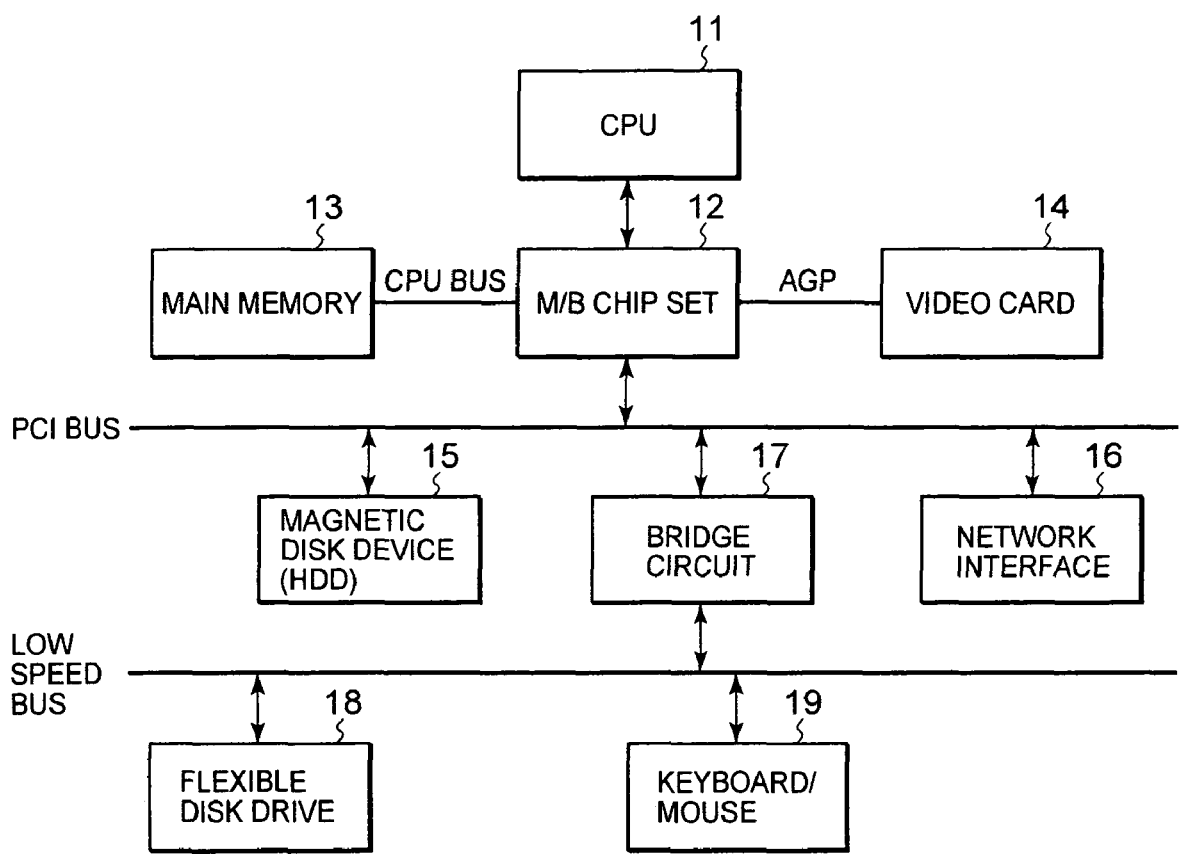
FIG. 5 is a diagrammatic view illustrating an example of the configuration of hardware of a computer apparatus suitable for a distributing server and a receiving terminal according to the embodiment of the present invention.

FIG. 5 is a schematic diagram showing an example of the preferable computer hardware configuration for the distributing server 100 and the receiving terminal 200.

The computer apparatus shown in FIG. 5 is provided with a CPU (Central Processing Unit) 11, a main memory 13 connected to the CPU 11 via a M/B (a motherboard) chip set 12 and CPU Bus, a video card 14 connected to the CPU 11 via similarly the M/B chipset 12 and an AGP (Accelerated Graphics Port), a magnetic disk device (HDD: Hard Disk Drive) connected to the M/B chipset 12 via a PCI (Peripheral Component Interconnect) Bus, a Network Interface 16, and a flexible disk drive 18 and a keyboard/mouse 19 both connected from the PCI Bus to the M/B chipset 12 via a bridge circuit 17 and a low speed Bus such as ISA (Industry standard Architecture) Bus.

It should be noted that the hardware configuration of the computer apparatus shown in FIG. 5 is only an exemplification for realizing the present embodiment of the present invention. Thus, any other configuration is usable so long as it is applicable to the present embodiment. For example, the configuration in which the image data is processed by the CPU 11 by installing only a video memory in place of installing video card 14 may be feasible. As an additional example, the drive for the CD-R (Compact Disc Recordable) and DVD-RAM (Digital Versatile Disc Random Access Memory) connected via an interface such as an ATA (AT Attachment) and a SCSI (Small Computer System Interface) and so forth as an external memory device may be provided. Also, needless to say, the receiving terminal 200 may be realized by the use of a mobile phone, a PDA (Personal Digital Assistant) or a proper rendering terminal or the like, instead of using the electronic computer device as shown in FIG. 5.

Figure 6:
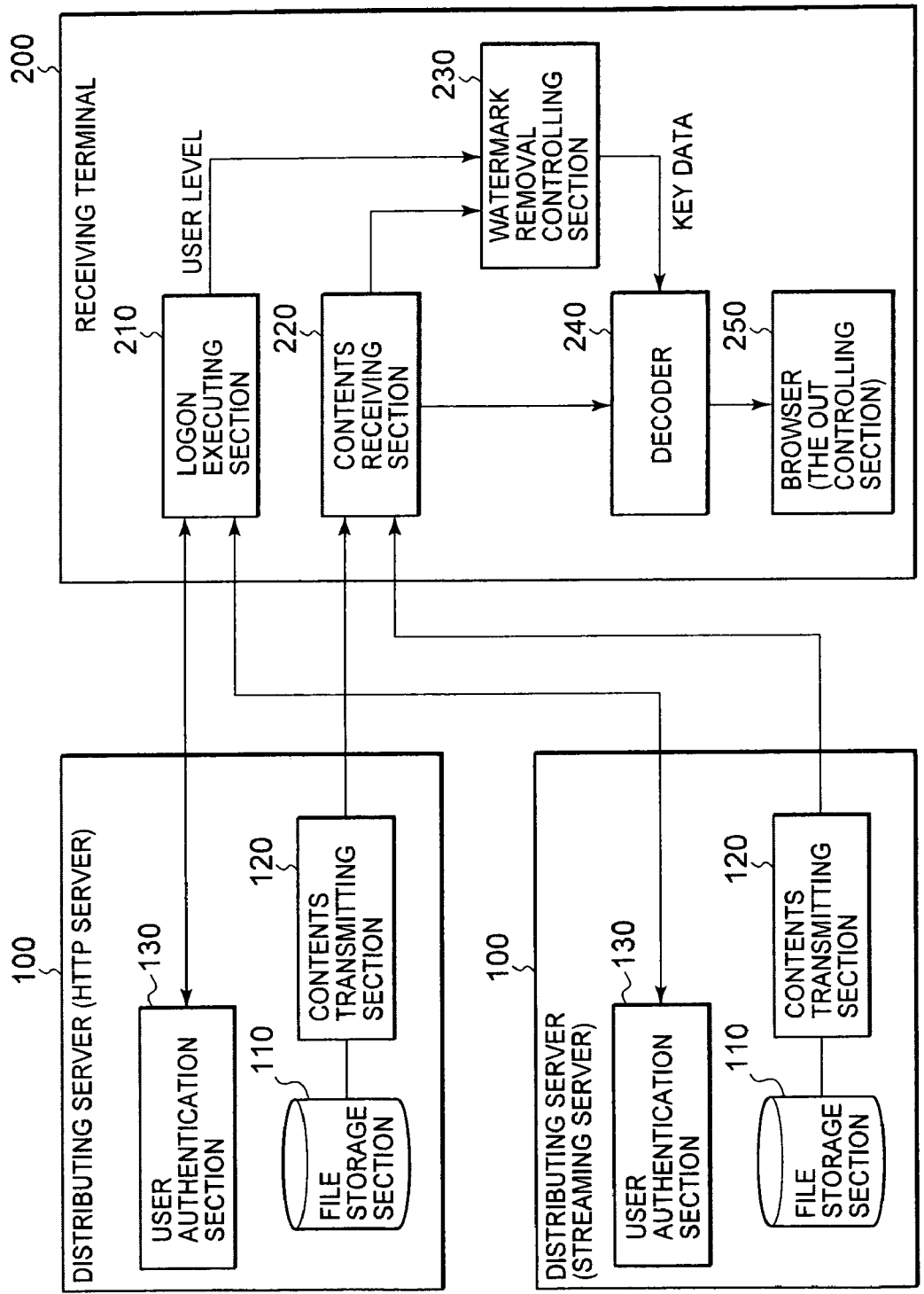
FIG. 6 is a schematic block diagram illustrating a functional configuration of the distributing server and the receiving terminal according to the embodiment of the present invention.

FIG. 6 is a schematic diagram illustrating a functional configuration of the distributing server 100 and the receiving terminal 200 in the present embodiment.

Referring now to FIG. 6, the distributing server 100 in the embodiment is provided with a file storage section 110, a content transmitting section 120 reading out Webcast content from the file storage section 110 and transmitting to the receiving terminal 200 and a user authentication section 130, which authenticates the user. A HTTP server distributing the still image content and a streaming server distributing the video content are described in FIG. 6, as the Webcast content composed of the still images and the video are assumed in the present embodiment. In a practical system, various types of server complying with the types of digital media constituting Webcast content for distribution is prepared for.

The file storage section 110 is realized by a memory means such as, for instance, the hard disk device 15 as shown in FIG. 5, and stores the files of the digital media constituting the Webcast content. In FIG. 6, the still image file such as JPEG file is stored in the file storage section 110 of the HTTP server and the video file such as MPEG file is stored in the file storage section 110 of the streaming server.

The content transmitting section 120 is realized by, for example, the CPU 11 shown in FIG. 5 controlled by a program, storage means such as a main memory 13 and the network interface 16, and transmits the file of the digital media read out of the file storage section 110 to the receiving terminal 200 on the Web-base.

The user authentication section 130 is realized by, for example, the CPU 11 shown in FIG. 5 controlled by a program, the memory means such as the main memory 13 and the network interface 16, and implements an authentication of a user of the receiving terminal 200, based on an access request from the receiving terminal 200. The user authentication section 130 also holds information on the correspondence between a user and a user level and accordingly, specifies the user level of the user concerned by the user authentication. In addition, the specified user level is retuned to the receiving terminal 200 as the result of the authentication. It is to be understood that the user level is a classification for establishing the user's competence for viewing of Webcast content. That is, the user level sets the user's competence that determines which visible digital watermark embedded in the digital media constituting Webcast content may be removed. Although a detailed description will be provided later, the user levels are predetermined depending upon viewable levels that regulate security for each scene of Webcast content. Further, in the present embodiment, the user level is described by a plain text without providing any security means such as coding or the like.

FIG. 7 is a diagrammatic view illustrating a state where there is a difference in the removable visible digital watermark depending on the user levels in Webcast content as shown in FIG. 4.

In the example shown in FIG. 7, the user in the user level 1 can remove all of the visible digital watermarks embedded in the still image and video. Therefore, all of the original still image and video included in Webcast content can be watched and listened to. On the other hand, the user in the user level 2 can remove only the visible digital watermark "B" embedded in the video of the scene 3. Therefore, while the video of the scene 3 can be watched and listened to, the video of the scene 2 and the still images and the video of the scene 4 cannot be watched and listened to. A detailed method of rendering control of Webcast content depending on the user levels will be provided hereinafter.

Furthermore, the receiving terminal 200 in the present embodiment shown in FIG. 6 includes therein a logon executing section 210 for executing a logon onto the distributing server 100, a content receiving section 220 for receiving a Webcast content from the distributing server 100, a watermark removal controlling section 230 and a decoder 240 which cooperate to remove a visible watermark embedded in a digital media of the Webcast content; and a browser (rendering control section) 250 for rendering (displaying or reproducing) the Webcast content.

The logon executing section 210 may be realized, for example, by a program-controlled CPU 11, a storage means such as a main memory 13 or the like, and a network interface 16, as shown in FIG. 5, and performs logon request with respect to the distributing server 100. A user ID necessary for user authentication is transmitted to the distributing server 100. In the distributing server 100, a user authentication section 130 performs a user-authentication by using the user ID. The logon executing section 210 receives a user level from the distributing server 100 as a result of the authentication, and gives the user level to the watermark removal controlling section 230.

The content receiving section 220 may be realized, for example, by a program-controlled CPU 11, a storage means such as a main memory 13 or the like, and a network interface 16, as shown in FIG. 5, and receives each digital media of the Webcast content transmitted from the distributing server 100 to store it into a storage device such as a magnetic disk device 15 or the like. The Webcast content is utilized by the watermark removal controlling section 230 and a decoder 240.

The watermark removal controlling section 230 may be realized, for example, by a program-controlled CPU 11, and a storage means such as a main memory 13 or the like, as shown in FIG. 5, and extracts key data embedded as an invisible digital watermark from each digital media of the Webcast content that was received from the content receiving section 220 to store the key data into the storage device such as a magnetic disk device 15 or the like. The key data stored in the storage device is utilized by the decoder 240. At this point, the key data that the watermark removal controlling section 230 can extract is limited according to the user level received from the logon executing section 210. An information on the correspondence between the user level and the extractable key data (i.e., an information as to which key data can be extracted for which level user) may be stored in advance in the watermark removal controlling section 230 or may be read out by the watermark removal controlling section 230 if the ID of the extractable key data is stored in the data of the user level. In addition, the information on the user level that can extract the key data may be embedded into a digital media together with the key data as the invisible digital watermark.

The decoder 240 may be realized, for example, by a program-controlled CPU 11, a storage means such as a main memory 13 or the like as shown in FIG. 5, and removes the visible digital watermark provided for each digital media of the Webcast content, by using the key data extracted by the watermark removal controlling section 230. The Webcast content from which the visible watermark is removed is stored into the storage device such as a magnetic disk device 15 or the like, and is read out by the browser 250 to rendering therefrom. It is to be noted that the mechanism of removing the visible watermark using the key data is not particularly limited. For example, in case the key data is a removal pattern by which the visible watermark is removed, the decoder 240 removes the visible watermark, by directly using the key data (removal pattern). In addition, in case that the key data is ID that specifies such a removal pattern or a treating method for removing the visible watermark, the decoder 240 removes the visible watermark, either by using the removal pattern or by the treating method specified by the key data (ID).

The browser 250 may be realized, for example, by a program-controlled CPU 11, a storage means such as a main memory 13 or the like, and a video card 14, as shown in FIG. 5, and renders (displays or reproduces) each digital media of the Webcast content. In the scene from which the visible watermark is removed by the decoder 240, the digital media rendered by the browser 250 is an original video scene or a still image of the Webcast content. In the scene from which the visible watermark is not removed by the decoder 240, the digital media is an image which is in the state where the visible watermark is embedded (that is, in the state where the original video or the still image is obscured or camouflaged).

Figure 8:
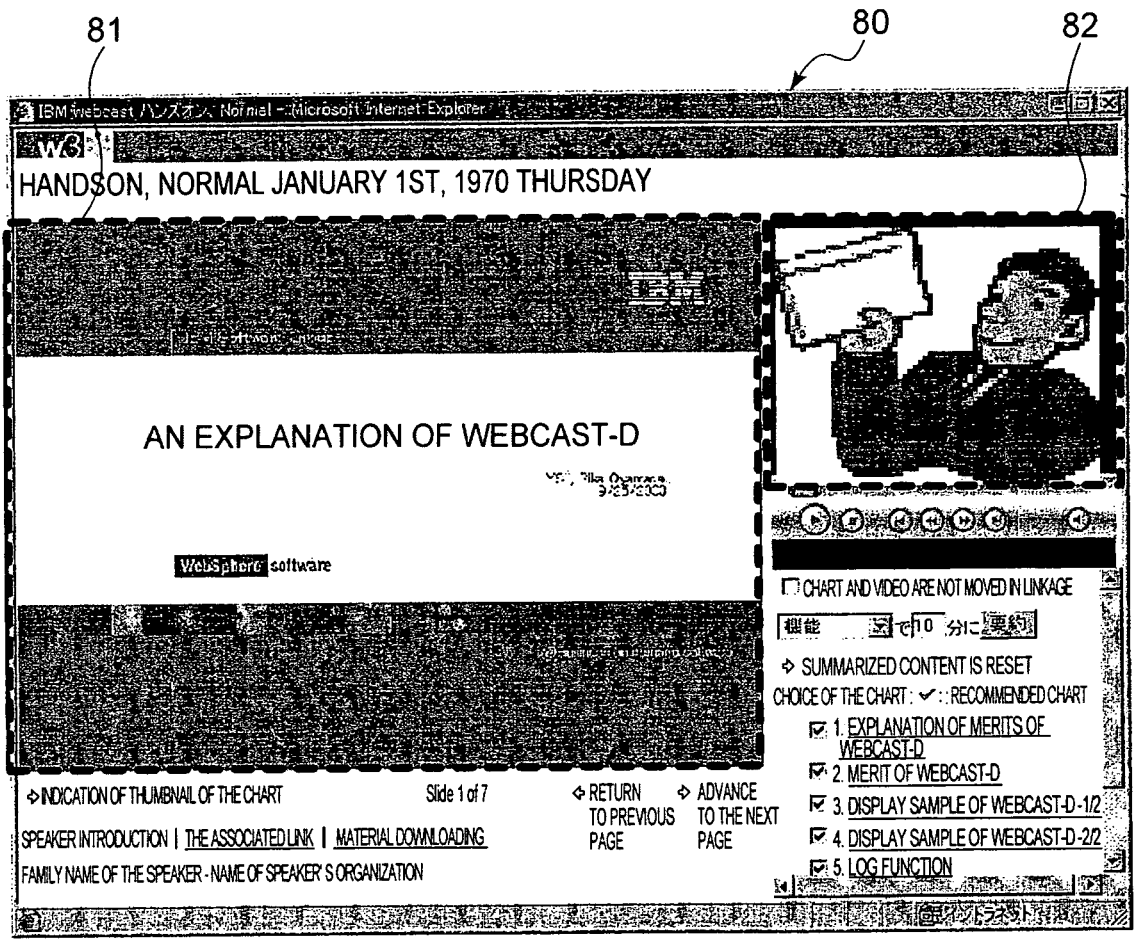
FIG. 8 is a schematic view illustrating an example of arrangement of a display of the Webcast content.

FIG. 8 is a drawing showing an example of a display of the Webcast content, which is displayed by the browser 250 on a display device. The display 80 shown in FIG. 8 contains a still image display section 81 where the still image is displayed and a video display section 82 where the video is displayed (both areas are enclosed by dot-lines, respectively).

The displaying of the still image on the still image display section 81 is performed in linkage with the displaying of the video on the video display section 82. That is to say, on the basis of correspondence between each digital media, the still image on the still image display section 81 switches according to the progress of reproduction of the video (with change of scenes). It should here be understood that the configuration of the display shown in FIG. 8 is mere an example, and the size, a layout and so forth of the still image display section 81 and the video display section 82 may be arbitrarily varied as required. Further, only either one of the still image and the video may be displayed.

Furthermore, an operation for distributing Webcast content according to the present embodiment will be described hereinbelow. At first, it is premised that a Webcast content including a plurality of digital media having respectively visible digital watermarks and key data suitably embedded therein is generated, and every digital media of the Webcast content is stored in a corresponding file storage section 110 in the distributing server 100.

Figure 9:
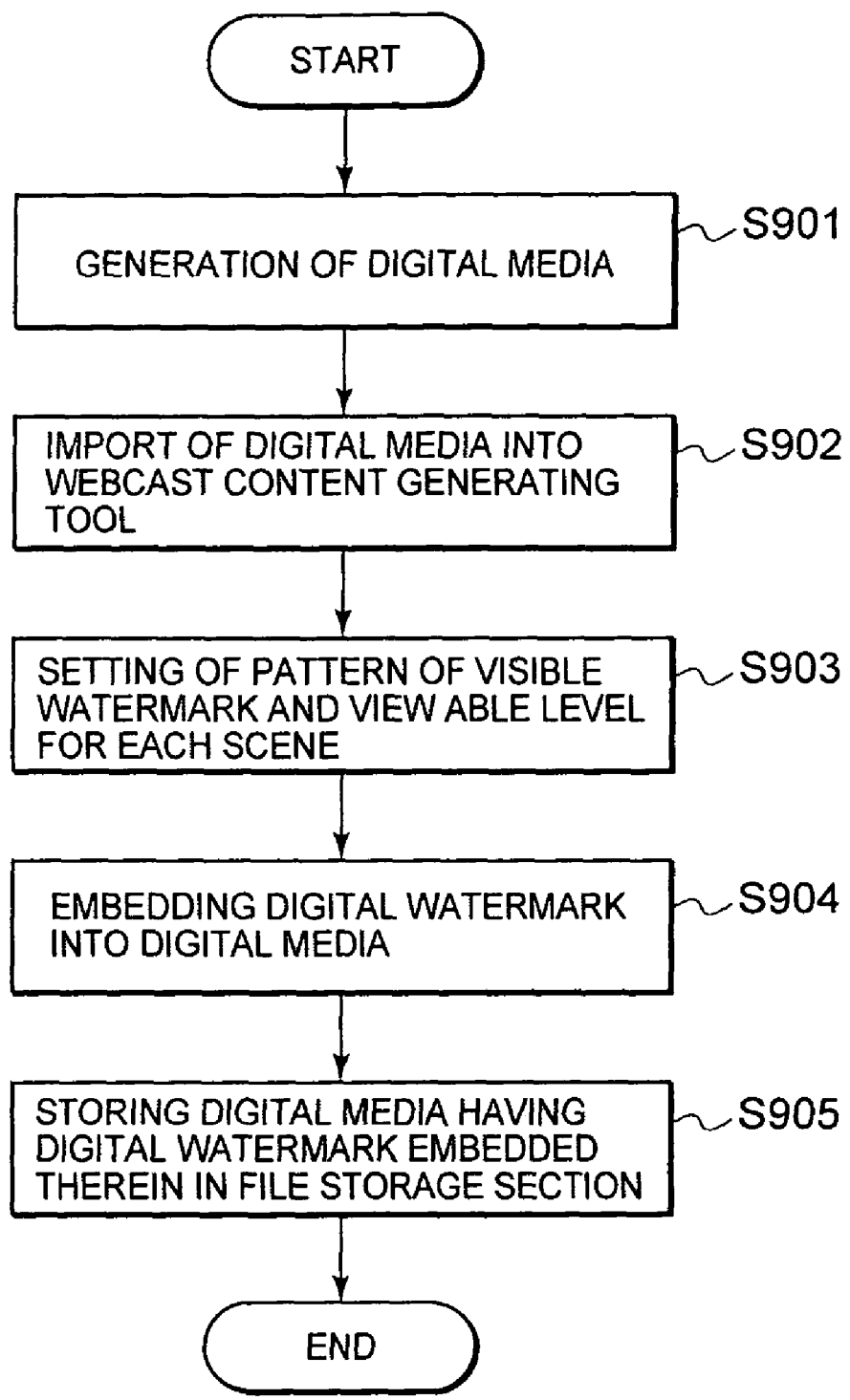
FIG. 9 is a flowchart illustrating sequence of generating the Webcast content in which the visible watermarks and the key data according to the embodiment of the present invention are embedded.

FIG. 9 is a flow chart illustrating a process of generating the Webcast content having the visible watermarks and key data embedded therein, according to the present embodiment.

Referring to FIG. 9, firstly, the digital media such as a video or a still image (for example, a video is displayed by using a MPEG file and a still image is displaced by using JPEG file) is generated (Step 901), and is imported to the Webcast content generating tool (hereinafter referred to as an authoring tool) which has started running on a computer (Step 902). As a result, respective digital media are correlated. A person who has created a Webcast content (hereinafter referred to as a content creator) can adjust a timing for switching a still image to another image (i.e., a position for segmenting a scene) by an operation employing the preview function of the authoring tool as required.

Thereafter, for each digital media with which corresponding scenes are correlated a pattern for a visible digital watermark is embedded for each scene and the viewable level is set (Step 903). The pattern for the visible watermark is prepared beforehand by a bit map or the like, and is stored in the storage device such as a magnetic disk device or the like. Further, the content creator selects an arbitrary pattern from a library of visible watermark patterns which have been prepared beforehand, and allocates the pattern for each scene. Also, the viewable level provides security for each scene of the Webcast content in accordance with a user level. For example, it is possible to provide the viewable level into three different stages and control each stage so that users in the user-level 1 can only watch and listen to (i.e., removing visible watermark) only the scenes in the viewable level 1, while users in the user-levels 2 can watch and listen to the scenes in the viewable levels 1 and 2, and users in the user-levels 3 can watch and listen to the scenes in the viewable levels 1 to 3.

The setting of both the visible watermark pattern and the viewable level is described by use of the metadata.

FIG. 10 is a diagrammatic view illustrating an example of setting of visible watermark patterns and the viewable level for each scene according to the metadata. In the example illustrated in FIG. 10, for each of the scenes there are provided descriptions of the start time and the duration, the corresponding still image, the visible watermark pattern embedded in the still image, the visible watermark pattern embedded in the video, and the viewable level, respectively. In addition, as for the actual metadata, the contents of the setting as illustrated in FIG. 10 are described using XML.

Furthermore, an operation to embed (to encode) the digital watermark (visible watermarks and invisible watermarks of the key data) in each digital media is actually performed (Step 904). For each scene of the video a visible watermark is embedded for hiding the video, and an invisible watermark of key data for removing the visible watermark is embedded in the still images corresponding to the video. Further, visible watermarks for hiding the still images are embedded there, and invisible watermarks for removing the visible watermarks are embedded in the scenes of the video corresponding to the still images. It should now be understood that this operation is executed with the batch processing according to the metadata prepared in Step 903. Each digital media in which digital watermarks are embedded in Step 904 is stored in the file storage section 110, respectively (Step 905).

From the foregoing, it will be understood that the Webcast content composed of the digital media with the visible watermarks and the key data embedded therein have been generated. Then, an operation when watching and listening to the above-mentioned Webcast content is implemented in the receiving terminal 200, which will be described hereinbelow.

Figure 11:
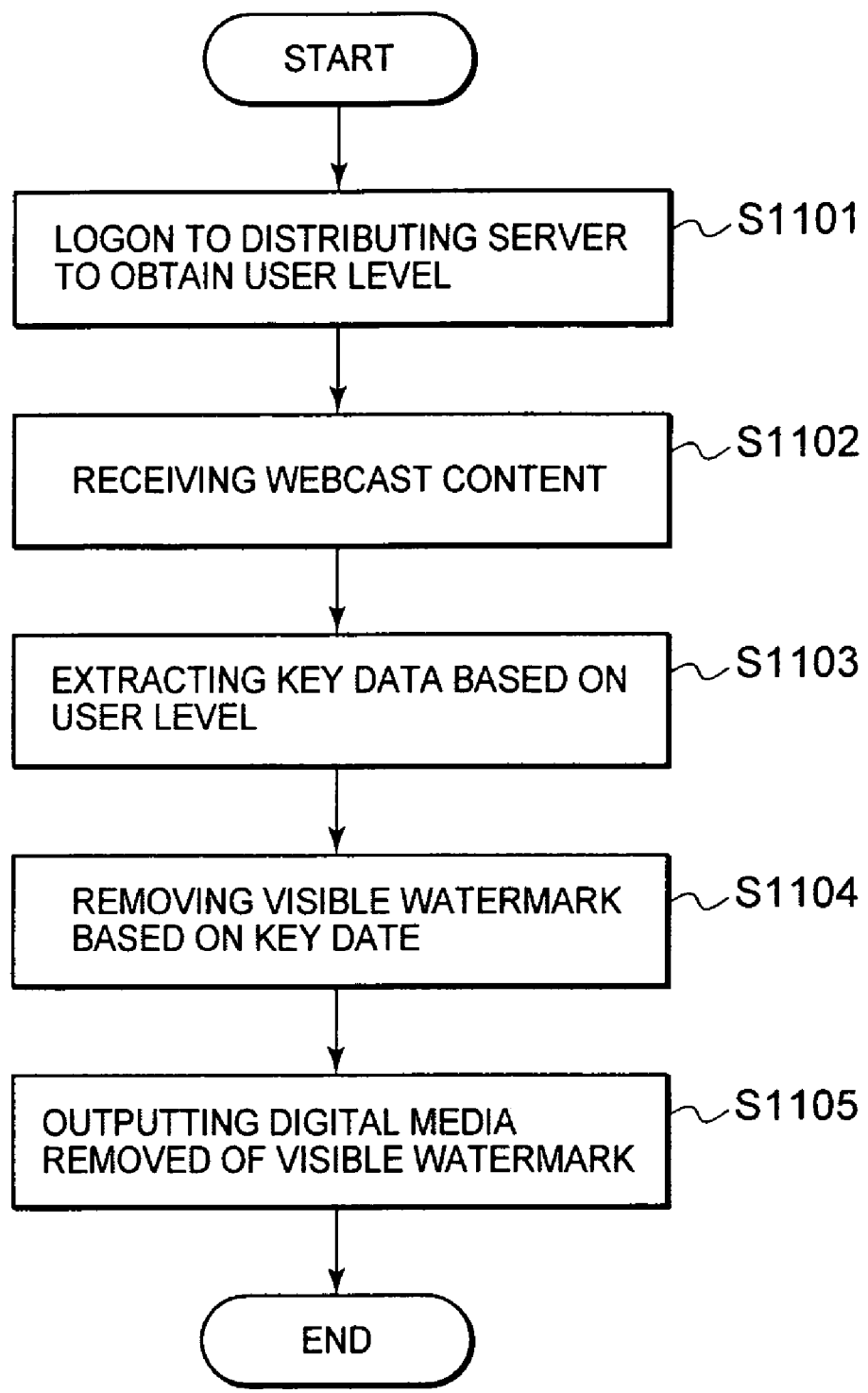
FIG. 11 is a flowchart illustrating an operation in which the receiving terminal accesses the distributing server to receive the Webcast content for rendering such content, according to the embodiment of the present invention.

FIG. 11 is a flowchart illustrating an operation permitting the receiving terminal 200 to access the distributing server 100 for receiving the Webcast content to thereby rendering the Webcast content.

Referring now to FIG. 11, the logon executing section 210 of the receiving terminal 200 makes a logon request for the distributing server 100 and obtains a user level corresponding to a user ID (Step 1101). Then, the content receiving section 220 receives a desired Webcast content (Step 1102).

When the desired Webcast content is received, watermark removal controlling section 230 extracts the key data embedded by means of invisible watermarks from the digital media of the Webcast content received at Step 1102 on the basis of the user level obtained at Step 1102 (Step 1103). At this point, when viewable level is set as explained in the afore-mentioned Step 903 in FIG. 9, all of the key data of visible watermarks are extracted if the user level is 1. If the user level is 2, the key data of visible watermarks in the scenes at viewable levels 2 and 3 are extracted. Further, if the user level is 3, only the key data of visible watermarks are extracted from the scene at the viewable level 3.

Subsequently, the decoder 240 removes the visible watermarks from the digital media of the Webcast content on the basis of the key data extracted by the watermark removal controlling section 230 (Step 1104). As described above, the key data extracted from the Webcast content are different depending on the user levels, the video and the still images from which the visible watermarks are removed in this step are different from one another depending on the users (the user levels). For example, in the example as shown in FIG. 7, for a user at the user level 1, all of the visible watermarks embedded in respective scenes of the video and in the still images may be removed. On the other hand, for a user at the user level 2, only visible watermarks at viewable level 2 (visible watermarks B) may be removed.

Finally, the browser 250 renders the digital media (the still images and the video) from which the visible watermarks are removed by the decoder 240 (Step 1105). In the example illustrated in FIG. 7, the users at the user level 1 are permitted to watch and listen to the primary still image and video all over the Webcast content. The users at the user level 2 are permitted to watch and listen to the primary still images and the video at the scene 1, the video at the scene 2, the still image at the scene 3 with no visible watermark embedded in the first place, and the video at the scene 3 the visible watermarks at viewable level 2 (the visible watermarks B) are embedded. However, they are prohibited from watching and listening to the still image at the scene 2 and the still image and the video at the scene 4 in which visible watermarks at the viewable level 1 (the visible watermarks A and C) are embedded.

The users who failed to acquire authentication at Step 1101 cannot extract any key data at all at Step 1103. Accordingly, they cannot remove all of the visible watermarks embedded in the respective digital media. As a result, they merely watch and listen to portions in a state where visible watermarks are embedded, except for portions in which no visible watermark is embedded (e.g., the still image and video at the scene 1, the video at the scene 2, and the still image at the scene 3 in the example of FIG. 7).

As is understood from the foregoing, according to the present embodiment, visible watermarks are embedded in the respective media constituting the Webcast content to protect the contents thereof, and key data are embedded in digital media that are different from the above-mentioned digital media having the visible watermarks embedded therein, in order to remove the visible watermarks. Hence, there is no need of separately sending key data to the receiving terminal 200 and there is also no need of preserving any secure transport layer between the distributing server 100 and the receiving terminal 200 for the purpose of ensuring the security of the key data. Therefore, the integration of the system is easy.

In the present embodiment, the key data for removing a visible watermark is transmitted together wit the Webcast content and, the setting of portions enabling each of the users to watch and listen to (i.e., enabling him or her to remove the visible watermark) is executed on the basis of authentication of each user. Therefore, it is not required that the result of authentication (the user level) per se be provided with any security means such as encoding or the like, and may be interchanged with plain text. Hence, each user at the receiving terminal 200 is not required to perform any cumbersome operation such as decoding the information necessary for removing the visible watermark.

Furthermore, in the present embodiment, respective digital media constituting the Webcast content are divided into scenes, and for each scene, a visible watermark to be embedded in the digital media and its key data are independently set. That is to say, it is possible to revise a method of removing the visible watermark scene by scene. The present embodiment therefore has such a flexibility that setting of the portions from which a user is able to remove visible watermarks to thereby watch and listen to them can be individually carried out for each user. In the described embodiment, although an explanation of the Webcast whose content is composed of the still image and video as digital media, even in the case where the digital media further includes audio, if sections are set on the basis of time offset similar to the scene in the video, it is possible to set visible watermark and the key data for each section.

Still further, in the present embodiment, the key data necessary for removing the visible watermark is embedded, as invisible watermark, in the digital media of the Webcast content. Namely, the visible watermarks for protecting the Webcast content as well as the key data for removing such visible watermarks may be used without making any revision to the file format specified for the original digital media that are digital watermarks. Hence, even in a case where the present embodiment is applied to the existing distribution system, which depends on the format of the digital media, it is possible to enjoy the advantages of the present embodiment without making any revision and so on to the file format. Therefore, the invention of the present embodiment may easily be introduced in the system of the existing Webcast. If encoding is conducted to protect the Webcast content and to ensure the security of the key data, and as a result, if the file format is varied from the original Webcast content, the described advantageous benefits could not be enjoyed.

In the above-described embodiment, the Webcast content distributed by the Webcast system through a network are chosen for explaining the mechanism to remove a visible watermark from the content protected by the visible watermark by employment of key data embedded in the same content. However, it should be understood that even in a case where Webcast content composed of a plurality of digital media are offered in a manner such that the Webcast content is stored in a CD-ROM or other suitable recording medium, if key data are appended to each of digital media for removing visible watermarks embedded in another digital media, it is possible to apply the mechanism of the present embodiment without any revision.

What is claimed is:

1. A content rendering method of rendering unified contents composed of a plurality of contents including at least first and second contents of web broadcasting, the method comprising:

embedding a first digital watermark in the first content within a first time-offset, such that visible watermarks are embedded with key data in each scene of the first content individually and independently of each other scene;

saving a first key in the second content enabling a removal of the first digital watermark;

embedding a second digital watermark in the second content within a second time-offset;

saving a second key in the second content enabling a removal of the second digital watermark;

storing the first content and second content from web broadcasting on a computer server;

setting viewable permission levels for each user wherein the viewable permission levels are set according to first and second viewable permission levels and a user level comprises first and second user levels wherein the first viewable permission level is viewable by the first user level and the second viewable permission level is viewable by the second user level;

detecting the first key from the second content during the second time-offset and detecting the second key from the first content during the first time-offset;

removing the first digital watermark based on the first key when the first key indicates the viewable permission level for the first content is the first viewable permission level, and removing the second digital watermark based on the second key when the second key indicates the viewable permission level for the first content is the second viewable permission level, and removing visible digital watermarks based on key data from invisible digital watermarks; and rendering the unified content, wherein the above steps are conducted using a computer while conducting web broadcasting.

2. A content rendering method for rendering unified contents composed of a plurality of contents including first and second contents of web broadcasting, wherein the first and second contents are sectioned for each scene to be rendered; and a given section of the first content has a first digital watermark embedded therein, and a section of the second content corresponding to the given section of the first content and has embedded therein, a first key enabling a removal of the first digital watermark;

a given section of the second content has a second digital watermark embedded therein, and a section of the first content corresponding to the given section of the second content has embedded therein, a second key enabling a removal of the second digital watermark;

such that visible first and second digital watermarks are embedded with first and second key data in each scene individually and independently of each other scene; and said method comprises:

storing a user level for respective users of the unified contents wherein the user level defines permissions for removing the first and second visible digital watermarks;

detecting the first key from the corresponding section of the second content;

detecting the second key from the corresponding section of the first content;

controlling whether to embed a first or second visible digital watermark for every scene and controlling a type of first or second digital watermark to be embedded;

detecting the user level of a user viewing the unified contents;

removing the first digital watermark of the given section of the first content based on the first key and the detected user level;

removing the second digital watermark of the given section of the second content based on the second key and the detected user level; and rendering the unified content, wherein the above steps are conducted using a computer while conducting web broadcasting.

3. A content rendering method for rendering unified contents composed of a plurality of contents including first and second contents of web broadcasting, the method comprising:

embedding a digital watermark in the first content such that visible watermarks are embedded with key data in each scene individually and independently of each other scene;

saving a key enabling a removal of the digital watermark in the second content; and setting viewable permission levels for each user based on a user level for each scene of web broadcasting on a scene by scene basis wherein the viewable permission levels are set according to first and second viewable permission levels and the user level comprises first and second user levels wherein the first viewable permission level is viewable by the first user level and the second viewable permission level is viewable by the second user level;

detecting the key from the second content;

memorizing user permission information indicating a viewable permission level of a user;

removing the digital watermark when the key data indicates the viewable permission level for the first content is the first viewable permission level and the key enabling removal in the second content is associated with the first user level or removing the digital watermark when the key data indicates the viewable permission level for the first content is the second viewable permission level and the key enabling removal in the second content is associated with the second user level; and rendering the unified contents, wherein the above steps are conducted using a computer while conducting web broadcasting.

4. A content rendering method for rendering unified contents composed of a plurality of contents including first and second contents of web broadcasting, the method comprising:

embedding a first digital watermark in the first content such that visible watermarks are embedded with key data in an image of each scene individually and independently of each other scene, and the first digital watermark is of plural types, and of a manner for preventing perception of the rendering of the first content and saving a first key in a data enabling a removal of the first digital watermark in the second content;

embedding a second digital watermark in the second content such that visible watermarks are embedded with key data in an image of each scene individually and independently of each other scene, and the second digital watermark is of plural types for preventing perception of the rendering of the second content;

storing a second key in a data enabling a removal of the second digital watermark in the first content;

setting viewable permission levels for each user based on a user level for each scene of web broadcasting on a scene by scene basis;

detecting the first key from data of the second content for a selected scene;

detecting the second key from data of the first content for a selected scene;

memorizing user permission information indicating a perception permission level of a user;

controlling whether or not the first or second digital watermarks should be removed based on the user permission information and the first or second key data in the image of the selected scene;

removing the first or second digital watermarks; and rendering the unified contents, wherein the above steps are conducted using a computer while conducting web broadcasting.

5. The content rendering method according to claim 1, wherein the rendering step is for rendering the first and second contents in synchronization.

6. The content rendering method according to claim 4, wherein the rendering step is for rendering the first and second contents in synchronization.

7. The content rendering method according to claim 1, further comprising a controlling step for limiting rendering of a part or all of the plurality of contents, depending on the user.

8. The content rendering method according to claim 5, further comprising a controlling step for limiting rendering of a part or all of the plurality of contents, depending on the user.

9. The content rendering method according to claim 6, further comprising a controlling step for limiting rendering of a part or all of the plurality of contents, depending on the user.

* * * * *